(12) United States Patent
Virabyan et al.

(10) Patent No.: US 11,071,611 B2
(45) Date of Patent: Jul. 27, 2021

(54) SANITARY PORTABLE SINGLE-USE DENTAL FLOSS DEVICE

(71) Applicants: Gagik Virabyan, North Hollywood, CA (US); Arman Medoyan, Van Nuys, CA (US)

(72) Inventors: Gagik Virabyan, North Hollywood, CA (US); Arman Medoyan, Van Nuys, CA (US)

( * ) Notice: Subject to any disclaimer, the term of this patent is extended or adjusted under 35 U.S.C. 154(b) by 0 days.

(21) Appl. No.: 16/412,695

(22) Filed: May 15, 2019

(65) Prior Publication Data

US 2020/0155283 A1 May 21, 2020

Related U.S. Application Data

(60) Provisional application No. 62/769,228, filed on Nov. 19, 2018.

(51) Int. Cl.
*A61C 15/04* (2006.01)

(52) U.S. Cl.
CPC .................. *A61C 15/043* (2013.01)

(58) Field of Classification Search
CPC ....... A61C 15/00; A61C 15/04; A61C 15/043; A61C 15/046; A63H 1/30; A45D 24/10
USPC ................ 132/322, 323, 324, 325; 433/141; 446/250; 63/15.4, 15.6; D24/152; D28/65, 66, 67, 68
See application file for complete search history.

(56) References Cited

U.S. PATENT DOCUMENTS

| | | | | |
|---|---|---|---|---|
| 788,947 A * | 5/1905 | Roth | ..................... | A61C 15/046 132/323 |
| 911,068 A * | 2/1909 | Perkins | ................ | A61C 15/046 132/325 |
| 1,419,402 A * | 6/1922 | Mosher | .................... | A63H 1/30 446/251 |
| 1,559,320 A * | 10/1925 | Hirsh | .................... | A61C 15/046 132/323 |
| 1,588,385 A * | 6/1926 | Miller | ................. | A61C 15/043 242/138 |
| 2,893,405 A * | 7/1959 | Castelli | ................ | A61C 15/043 132/321 |
| 3,696,821 A * | 10/1972 | Adams, IV | .......... | A61C 15/046 132/324 |
| 3,802,445 A * | 4/1974 | Wesley | ................ | A61C 15/043 132/321 |
| 3,804,102 A * | 4/1974 | Bennington | ......... | A61C 15/043 132/321 |
| 3,901,251 A * | 8/1975 | Johnston | ............. | A61C 15/046 132/325 |

(Continued)

*Primary Examiner* — Yogesh P Patel
*Assistant Examiner* — Jennifer Gill
(74) *Attorney, Agent, or Firm* — Richard Hepner

(57) ABSTRACT

A Sanitary Portable Single-Use Floss Device (SPSFD), designed to enable a user to carry a single-use portion of dental floss in a manner that protects the dental floss from contamination during storage or transportation, such as in a pocket or a purse, is disclosed; the device comprising a spool, a length of dental floss wound about the shaft of the spool, the dental floss being protected from contamination by the spool, and a grab ball or ring functioning as a means to hold the length of dental floss in the stowed condition, and as a means of holding the deployed length of dental floss for use. A method of using said SPSFD is also disclosed.

1 Claim, 3 Drawing Sheets

(56) References Cited

U.S. PATENT DOCUMENTS

| | | | | |
|---|---|---|---|---|
| 4,034,770 A * | 7/1977 | Trecker | A61C 15/046 | 132/321 |
| 4,254,786 A * | 3/1981 | Won | A61C 15/046 | 132/325 |
| 4,332,559 A * | 6/1982 | Dolinsky | A61C 15/046 | 433/91 |
| 4,638,824 A * | 1/1987 | De La Hoz | A61C 15/046 | 132/323 |
| 4,643,674 A * | 2/1987 | Zdarsky | A61C 3/00 | 433/102 |
| 4,706,843 A * | 11/1987 | Thornton | A01K 89/00 | 221/48 |
| 4,796,783 A * | 1/1989 | Paulson | A61C 15/043 | 132/286 |
| 4,934,389 A * | 6/1990 | Pettiford | A61C 15/043 | 132/324 |
| 5,199,452 A * | 4/1993 | Cheng | A61C 15/043 | 132/323 |
| 5,253,662 A * | 10/1993 | Won | A61C 15/046 | 132/324 |
| 5,305,768 A * | 4/1994 | Gross | A61C 15/046 | 132/321 |
| 5,503,168 A * | 4/1996 | Wang | A61C 15/046 | 132/323 |
| 5,564,446 A * | 10/1996 | Wiltshire | A45D 44/18 | 132/309 |
| 5,570,710 A * | 11/1996 | Wei | A61C 15/043 | 132/321 |
| 5,573,022 A * | 11/1996 | Winters | A61C 15/043 | 132/323 |
| 5,607,050 A * | 3/1997 | Dolan | A61C 15/043 | 206/63.5 |
| 5,653,246 A * | 8/1997 | Wei | A61C 15/043 | 132/323 |
| 5,680,875 A * | 10/1997 | Winters | A61C 15/043 | 132/323 |
| 5,685,325 A * | 11/1997 | Wei | A61C 15/043 | 132/323 |
| 5,692,532 A * | 12/1997 | Gabrovsek | A61C 15/046 | 132/323 |
| 5,778,906 A * | 7/1998 | Wei | A61C 15/046 | 132/323 |
| 5,911,229 A * | 6/1999 | Chodorow | A61C 15/046 | 132/321 |
| 6,065,480 A * | 5/2000 | Mader | A61C 15/046 | 132/323 |
| 6,397,853 B1 * | 6/2002 | Lovick | A45D 29/17 | 132/321 |
| 7,146,987 B2 * | 12/2006 | Tse | A61C 15/043 | 132/323 |
| 7,234,473 B1 * | 6/2007 | Winters | A46B 15/0071 | 132/309 |
| 7,325,553 B2 * | 2/2008 | Sievers | A61C 15/046 | 132/323 |
| 8,006,709 B1 * | 8/2011 | Ebnayamin | A61C 15/043 | 132/325 |
| 8,042,556 B2 * | 10/2011 | Bowsher | A61C 15/046 | 132/323 |
| 8,544,481 B1 * | 10/2013 | Smith | A46B 11/0041 | 132/309 |
| 10,517,703 B2 * | 12/2019 | Pines | A61C 15/046 | |
| 2001/0039955 A1 * | 11/2001 | Winters | A46B 15/0071 | 132/309 |
| 2004/0250834 A1 * | 12/2004 | Bowsher | A61C 15/046 | 132/323 |
| 2005/0109366 A1 * | 5/2005 | Sievers | A61C 15/046 | 132/323 |
| 2005/0175962 A1 * | 8/2005 | Haje | A61C 15/00 | 433/136 |
| 2006/0005855 A1 * | 1/2006 | Tse | A61C 15/043 | 132/323 |
| 2009/0199865 A1 * | 8/2009 | Bish | A45D 42/00 | 132/316 |
| 2012/0054973 A1 * | 3/2012 | Mostatab | A61C 15/00 | 15/167.1 |
| 2013/0061864 A1 * | 3/2013 | Orma | A61C 15/046 | 132/200 |
| 2014/0000646 A1 * | 1/2014 | Safieh | A61C 15/046 | 132/323 |
| 2015/0007844 A1 * | 1/2015 | Devins | A61C 15/046 | 132/200 |
| 2015/0122281 A1 * | 5/2015 | Martens | A61C 15/042 | 132/200 |
| 2015/0265383 A1 * | 9/2015 | Pines | A61C 15/046 | 132/329 |
| 2016/0067020 A1 * | 3/2016 | Hintz | A61C 15/043 | 132/325 |
| 2016/0199163 A1 * | 7/2016 | Kabrin | A61C 15/043 | 433/216 |
| 2016/0236102 A1 * | 8/2016 | Shlomot | A63H 1/30 | |
| 2016/0346067 A1 * | 12/2016 | Pines | A61C 15/046 | |
| 2017/0239027 A1 * | 8/2017 | Dargan | A61C 15/046 | |
| 2018/0229131 A1 * | 8/2018 | Theiner | A63H 1/30 | |

* cited by examiner

SANITARY PORTABLE SINGLE-USE DENTAL FLOSS DEVICE

CROSS-REFERENCE TO RELATED APPLICATION

This application claims the benefit of U.S. Provisional Application No. 62/769,228, filed Nov. 19, 2018.

FIELD OF THE INVENTION

Broadly, the present invention pertains to the field of dental care. More specifically, the present invention [hereinafter "Sanitary Portable Single-use Floss Device (SPSFD)"] provides an apparatus for performing the function of flossing a user's teeth. More specifically, the apparatus enables a user to carry a single-use portion of dental floss in a manner that protects the dental floss from contamination during storage or transportation, such as in a pocket or a purse.

BACKGROUND OF THE INVENTION

Unless specifically indicated otherwise, the materials described in this section are not prior art to the claims in this application, and are not admitted to be prior art by inclusion in this section.

The material in this patent document is subject to copyright protection under the copyright laws of the United States and other countries. The copyright owner grants a limited license to any member of the public to reproduce the patent document as it appears in official governmental records. All other copyrights rights are reserved.

It is generally recognized that regularly flossing one's teeth is an important component of maintaining healthy teeth and gums, and fresh breath. Experts recommend flossing after every meal, or whenever there is a need to remove particles of food from between teeth.

People regularly have meals or snacks when away from home. The problem presented is how to floss teeth when away from home. The associated challenges include how to person carry a convenient, practical, single-use length of dental floss that is available when needed, that is easy to use, and how to keep that length of dental floss sanitary while being transported, for example in a pocket or purse.

Others have addressed the problem of providing a means of holding and using dental floss. Each attempted solution has limitations and deficiencies. Representative attempted solutions are presented below by way of example.

U.S. Pat. No. 3,746,017 to Casselman is typical of a number of conventional art devices designed to provide a sanitary length of dental floss for each use. Casselman discloses a dental floss holder and applicator having a floss storage and dispensing reel and a floss take-up reel and an arcuate arm to hold floss in the application position. On the one hand, the invention of Casselman does provide a means to present a sanitary length of dental floss for each use. On the other hand, a primary limitation and deficiency of such devices is the complexity of the design. That complexity means a significant cost to produce the device, making it impractical for use as a single use, disposable device. Further, the complexity drives such devices to a size that is impractical to carry in a pocket or even in a purse.

U.S. Pat. No. 3,474,799 to Cappello is representative of simpler conventional designs. Cappello discloses a dental floss holder device designed to hold a length of dental floss between the tines of a forked structure. While the device of Cappello may arguably provide a portable flossing device, it is neither single-use nor sanitary. The device is intended to be reused by removing and replacing the length of dental floss between each use. Therefore, the forked structure remains contaminated after each use. Further, when a new length of dental floss is installed into the forked structure, the floss is fully exposed to contamination while transported, such as in a pocket or a purse.

In U.S. Pat. No. 5,224,501 to McKenzie, McKenzie discloses a potentially disposable device. According to McKenzie, a dental floss holder device is designed to hold a length of dental floss between a pair of handles. McKenzie characterizes the device as being either disposable or sterilizable for reuse. The principal limitation and deficiency of the device of McKenzie is that the length of dental floss is not protected from contamination while being transported, such as in a pocket or a purse.

The present invention addresses and eliminates the limitations and disadvantages inherent to currently existing approaches to solving the problem of storing, holding and using dental floss.

As is readily apparent from a review of conventional approaches to storing, holding and using dental floss, what is needed is a device that is designed to be conveniently carried by a person, such as in a pocket or a purse; to remain sanitary during such transport; to be easy to use; and to be single-use and disposable, and therefore inexpensive to manufacture.

SUMMARY OF THE INVENTION

In view of the foregoing limitations and disadvantages inherent to the conventional related art, the present invention provides a useful and novel apparatus for storing, holding and using dental floss that is designed to be conveniently carried by a person, such as in a pocket or a purse; to remain sanitary during such transport; to be easy to use; and to be single-use and disposable, and therefore inexpensive to manufacture.

A principal object of the present invention is to provide a means of transporting a dental floss device in a manner that keeps the dental floss in a sanitary condition during transport.

In one aspect, the present invention provides a protective spool having a shaft about which a length of dental floss may be wrapped, the dental floss then being protected by the body of the protective spool from contacting the inside of a pocket or purse during transport.

In another aspect, the present invention further provides a ring that encloses the protective spool, thereby preventing any contaminant from entering the spool.

Another object of the present invention is to provide a dental floss device that is easy to use.

In one aspect, the present invention provides a grab ball that is stowed for transport within a protective spool. The grab ball, and the length of dental floss to which the grab ball is attached, may be deployed for use by pinching the spool, thereby releasing the grab ball. The user may then hold the grab ball in one hand, and the spool in the other hand, providing both an anthropometrically convenient and sanitary means of holding the device during use.

In another aspect, the present invention provides a ring that is stowed for transport about a protective spool. The ring, and the length of dental floss to which it is attached, may be deployed by pressing down on the face of the protective spool while supporting the ring, thereby releasing the ring. The user may then hold the ring in one hand, and the protective spool in the other hand, providing both an anthropometrically convenient and sanitary means of holding the device during use.

Still another object of the present invention is to provide a dental floss device that is single-use and disposable.

In one aspect, the present invention, the present invention is a simple device that may be inexpensively produced for the purpose of disposing of the contaminated device after use.

A further advantage of the present invention is that a restaurant may provide the device to patrons as an affordable, practical, and superior option to a toothpick.

Other objects, aspects and advantages of the present invention will become readily apparent to those with skill in the art from the following figures, descriptions and claims. As will be appreciated by those with skill in the related art, the invention may be implemented in a plurality of equivalent embodiments. Such alternative embodiments, and their attendant objects, aspects and advantages, are within the scope of the present invention and, therefore, the examples set forth herein shall not be limiting.

BRIEF DESCRIPTION OF THE DRAWINGS

The nature of this invention, as well as all its objects, aspects and advantages, will become readily apparent and understood upon reference to the following detailed description when considered in conjunction with the accompanying drawings, in which like reference numerals designate like parts throughout the figures thereof, and wherein.

DETAILED DESCRIPTION OF THE INVENTION

The following description is provided to enable a person skilled in the relevant art to make and use the invention, and sets forth the best currently contemplated modes of carrying out exemplary embodiments of the invention. The present invention shall not be limited to the examples disclosed. Rather, the scope of the invention shall be as broad as the claims will allow.

Various inventive features are described below that may each be used independently of one another or in combination with other features. However, any single inventive feature may not address any of the disadvantages or objects discussed above, or might address only one of the disadvantages or objects discussed above. Further, one or more of the disadvantages or objects discussed above may not be fully addressed by any of the features described below.

NOMENCLATURE AND LISTING OF ELEMENTS

Figure 1:
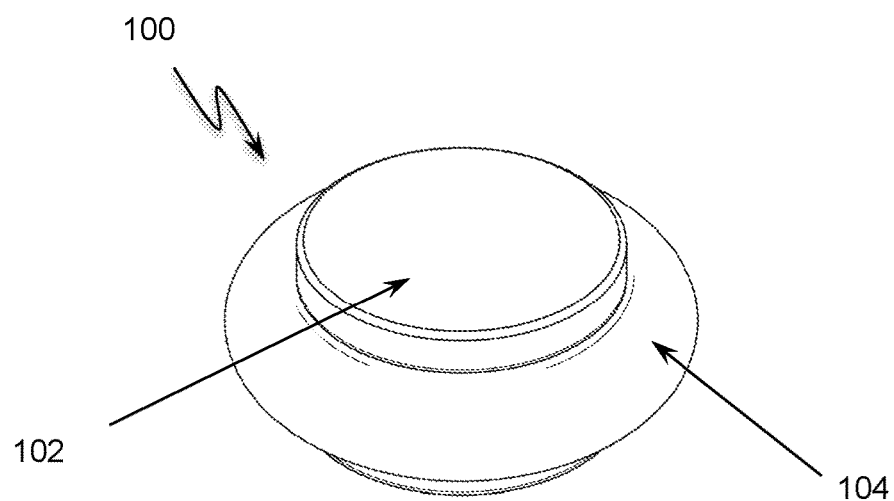
FIG. 1 presents a perspective view of a SPSFD in its stowed condition, according to one exemplary embodiment of the device.
Figure 2:
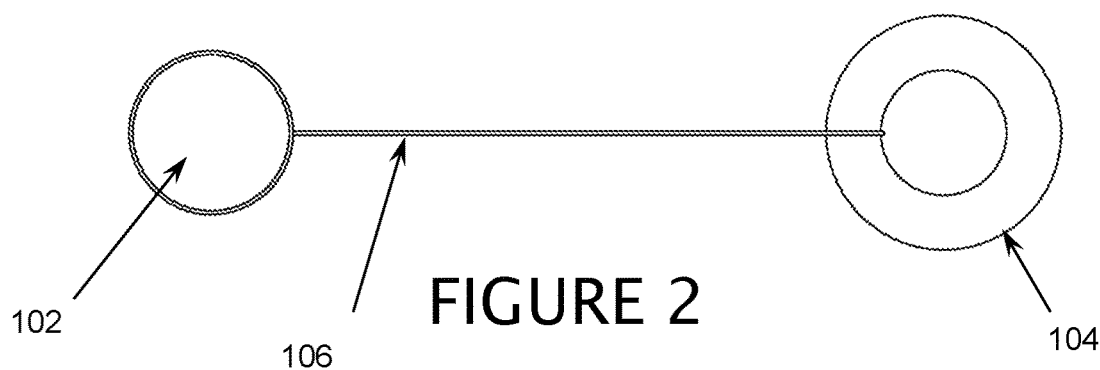
FIG. 2 presents a top view of the SPSFD of FIG. 1 in its deployed condition.
Figure 3:
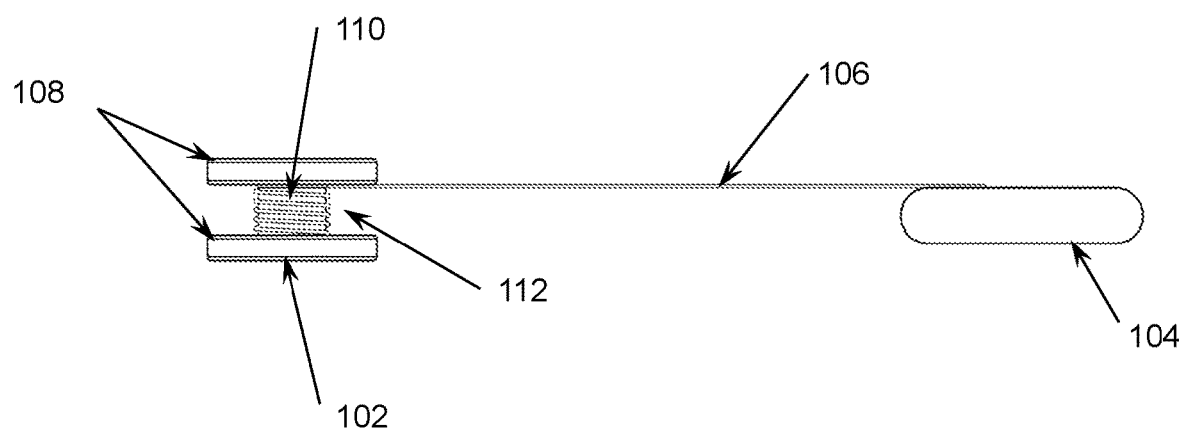
FIG. 3 presents a side view of the SPSFD of FIG. 1 in its deployed condition.
Figure 4:
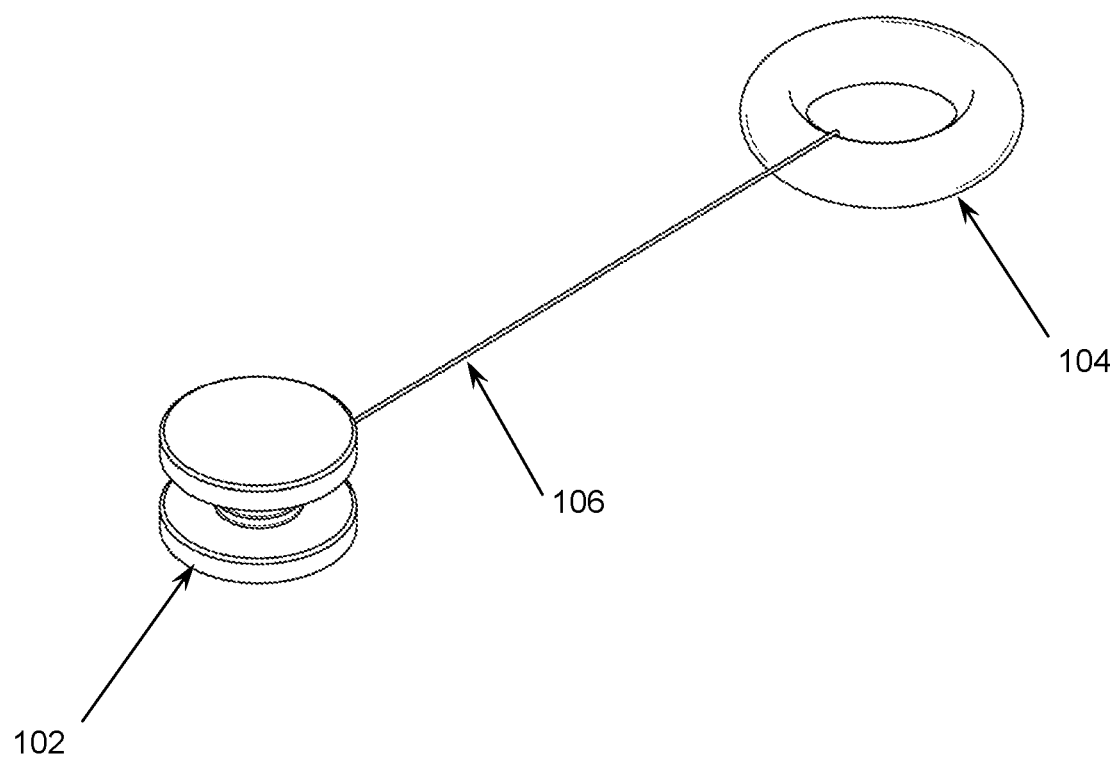
FIG. 4 presents a perspective view of the SPSFD of FIG. 1 in its deployed condition.

100 Sanitary Portable Single-use Floss Device (SPSFD)
102 protective spool
104 ring
106 dental floss
108 flange
110 shaft
112 cavity
200 Sanitary Portable Single-use Floss Device (SPSFD)
202 protective spool
204 grab ball
206 dental floss
208 pinch point
210 shaft
212 annular channel
214 flange
216 cavity Referring now to the drawings, FIGS. 1 through 4 illustrate a SPSFD 100 according to one exemplary embodiment of the device. FIG. 1 presents the device in its stowed condition. FIGS. 2 through 4 present the device in its deployed condition. A protective spool 102 may comprise two flanges 108 and a shaft 110, said shaft 110 structurally connecting the two flanges 108. A ring 104 may be press fitted onto a protective spool 102, thereby creating a sealed cavity 112 that may keep contaminants away from dental floss 106 that may be stowed within the cavity 112. The dental floss 106 may be attached at one end to the ring 104, and at the other end to the protective spool 102.

Referring to FIG. 1, a user may deploy the device 100 by holding the ring 104 in the user's fingers, then pressing on the top of the protective spool 102, thereby causing the ring 104 to pop off of the protective spool 102. The ring 104 may then be grasped in one of the user's hands and pulled away from the protective spool 102 as the protective spool 102 may be held in the user's other hand, thereby deploying the dental floss 106 for use, as illustrated in FIG. 2 through FIG. 4.

Figure 5:
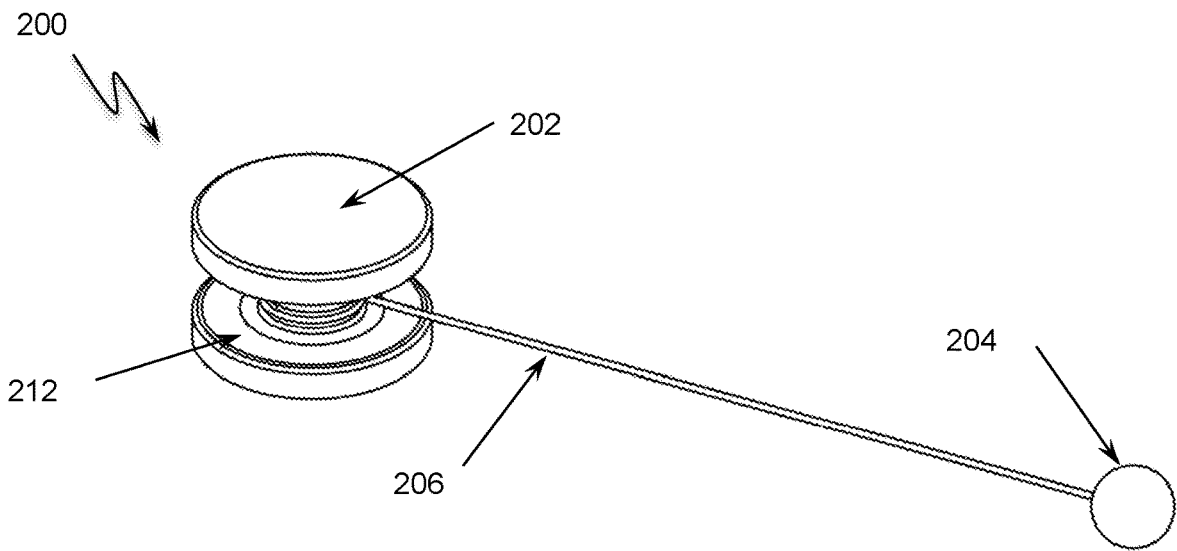
FIG. 5 presents a perspective view of a SPDFD in its deployed condition, according to one exemplary embodiment of the device.
Figure 6:
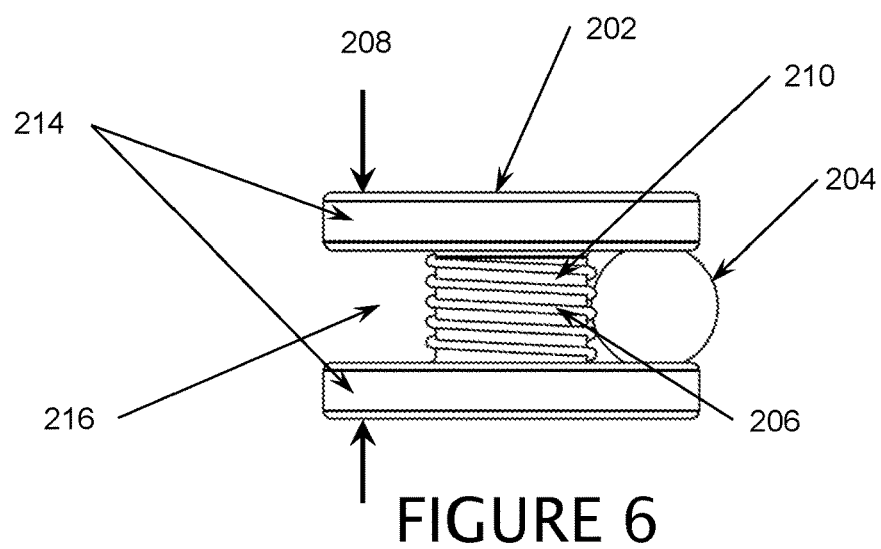
FIG. 6 presents a side view of the SPSFD of FIG. 5 in its stowed condition.
Figure 7:
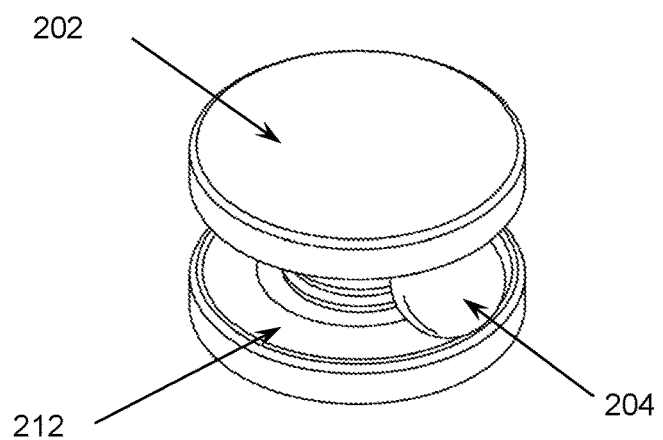
FIG. 7 presents a perspective view of the SPSFD of FIG. 5 in its stowed condition.

FIGS. 5 through 7 illustrate a SPFD 200 according to another exemplary embodiment of the device. FIGS. 6 and 7 show the device in its stowed condition. An annular channel 212 may be disposed about the internal perimeter of each flange 214 of a protective spool 202, said annular channels 212 being designed to accept and secure a grab ball 204 within the annular channels 212. A length of dental floss 206 may be attached at one end to the grab ball 204, and at the other end to a shaft 210 that structurally connects the two flanges 214 of the protective spool 202. The dental floss 206 may be wound around the shaft 210 of the protective spool 202 while the device is in its stowed condition, thereby protecting the dental floss 206 from contamination.

In an alternative embodiment of the device, there may be a single annular channel disposed about the internal perimeter of only one of the flanges of the protective spool.

To deploy the device for use, a user may grasp and pinch the protective spool 202 at a pinch point 208, which is a location on the perimeter of the flanges 214 of the protective spool 202 approximately 180 degrees away from the location of the stowed grab ball 204. As the user pinches the protective spool 202 at the pinch point 208, the lips of the two flanges 214 of the protective spool 202 at the pinch point 208 may deflect toward one another, causing the two flanges 214 of the protective spool 202 in the proximity of the grab ball 204 to separate, thereby releasing the grab ball 204 from the annular channels 212.

The grab ball 204 may then be grasped in one of the user's hands and pulled away from the protective spool 202 as the protective spool 202 may be held in the user's other hand, thereby deploying the dental floss 206 for use, as illustrated in FIG. 5.

In alternative embodiments of the present invention, the spherical grab ball may be replaced by a grasping device of another shape.

It should be understood, of course, that the foregoing relates to exemplary embodiments of the invention, and that alternative embodiment and/or modifications to the disclosed exemplary embodiments may be made without departing from the spirit and scope of the invention as set forth in the following claims.

What is claimed is:

1. A dental floss dispensing apparatus for maintaining dental floss in a sanitary condition when the apparatus is in its stowed condition, and for flossing a user's teeth when the apparatus is in its deployed condition, consisting of:
   a. a protective spool, said protective spool having
      i. a shaft,
      ii. a first flange affixed to one end of said shaft, and
      iii. a second flange affixed to the other end of said shaft,
      iv. said first flange and said second flange defining a cavity about said shaft;
   b. a torus-shaped ring press-fitted over either one of said first flange or said second flange such that said ring fully encircles, fully encloses, and seals said cavity when the apparatus is in its stowed condition; and
   c. a length of dental floss stowed within said cavity by wrapping said length of dental floss about said shaft, a first end of said length of dental floss attached to said spool, and a second end of said length of dental floss attached to said ring.

* * * * *